United States Patent
Sano (10) Patent No.: US 10,132,963 B2
(45) Date of Patent: Nov. 20, 2018

(54) OPTICAL ELEMENT AND OPTICAL APPARATUS

(71) Applicant: CANON KABUSHIKI KAISHA, Tokyo (JP)

(72) Inventor: Daisuke Sano, Moka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/277,122

(22) Filed: Sep. 27, 2016

(65) Prior Publication Data

US 2017/0097445 A1    Apr. 6, 2017

(30) Foreign Application Priority Data

Oct. 5, 2015    (JP) .................................. 2015-197553

(51) Int. Cl.
*G02B 1/115*    (2015.01)

(52) U.S. Cl.
CPC .................................... *G02B 1/115* (2013.01)

(58) Field of Classification Search
CPC .......... G02B 5/285; G02B 5/201; G02B 5/28; G02B 5/284; G02B 26/001; G02B 5/288; G02B 5/286; G02B 5/287; G02B 5/281; G02B 1/005; G02B 27/142; G02B 5/0841; G02B 5/3041; G02B 5/305; G02B 1/11; G02B 5/0816; G02B 5/26; G02B 5/283
USPC ....... 359/589, 359, 585, 590, 578, 583, 584, 359/885
See application file for complete search history.

(56) References Cited

FOREIGN PATENT DOCUMENTS

JP    2005055543 A    *    3/2005

OTHER PUBLICATIONS

JP 2005055543 A Original and English Machine Translation.*

* cited by examiner

*Primary Examiner* — William Choi
*Assistant Examiner* — Sharrief Broome
(74) *Attorney, Agent, or Firm* — Rossi, Kimms & McDowell LLP (57) ABSTRACT

An optical element includes an optical surface having a multilayer film. The multilayer film comprises a stack that includes a first film having a first refractive index for a used wavelength and a second film having a second refractive index for the used wavelength smaller than the first refractive index. Outermost layers of the stack are configured by the first films. A film configuration of the stack has symmetry along with a stack direction. The predetermined conditional expressions are satisfied.

6 Claims, 8 Drawing Sheets

OPTICAL ELEMENT AND OPTICAL APPARATUS

BACKGROUND OF THE INVENTION

Field of the Invention

The present invention relates to an optical element and an optical apparatus.

Description of the Related Art

A thin film has been widely used in an optical element. The thin film means a film having a thickness of about a wavelength of light or less and adjusting optical functions using an interference effect of light. For example, to enhance a transmission quantity, an antireflection film cancelling light waves is formed on an optical lens. Additionally, to divide light into reflected light and transmitted light for each polarization, a polarizing separation element increasing light waves is formed on a polarizing separation element. In Japanese Patent Laid-Open No. ("JP") 2005-55543, to obtain desired characteristics, a polymer optical multilayer film having stacked polymer thin films of which a refractive index and a thickness is appropriately selected is disclosed.

However, a conventional technology disclosed in JP 2005-55543 uses a common material as the polymer thin films and thus is sensitive for wavelength characteristics and incident angle characteristics.

SUMMARY OF THE INVENTION

In view of the problem, it is an object of the present invention to provide an optical element superior for wavelength characteristics and incident angle characteristics.

An optical element according to one aspect of the present invention includes an optical surface having a multilayer film. The multilayer film comprises a stack that includes a first film having a first refractive index for a used wavelength and a second film having a second refractive index for the used wavelength smaller than the first refractive index, outermost layers of the stack are configured by the first films, a film configuration of the stack has symmetry along with a stack direction, and the following conditional expressions are satisfied:

$$\frac{2U_H U_M \tan\Delta_H + U_M^2 \tan\Delta_M - U_H^2 \tan^2\Delta_H \tan\Delta_M}{2U_H U_M \tan\Delta_H + U_H^2 \tan\Delta_M - U_M^2 \tan^2\Delta_H \tan\Delta_M} > 0$$

$$U_{H,M} = n_{H,M} \cos\theta_i$$

$$\Delta_{H,M} = \frac{2\pi}{\lambda_i} n_{H,M} d_{H,M} \cos\theta_{H,M}$$

where $\lambda_i$ is the used wavelength, $\theta_i$ is an incident angle of light incident on the multilayer film, $n_H$ is the first refractive index, $n_M$ is the second refractive index, $d_H$ is a physical thickness of the first film, and $d_M$ is a physical thickness of the second film.

DESCRIPTION OF THE EMBODIMENTS

Exemplary embodiments of the present invention will be described below with reference to the accompanied drawings. In each of the drawings, the same elements will be denoted by the same reference numerals and the duplicate descriptions thereof will be omitted.

Figure 1A:
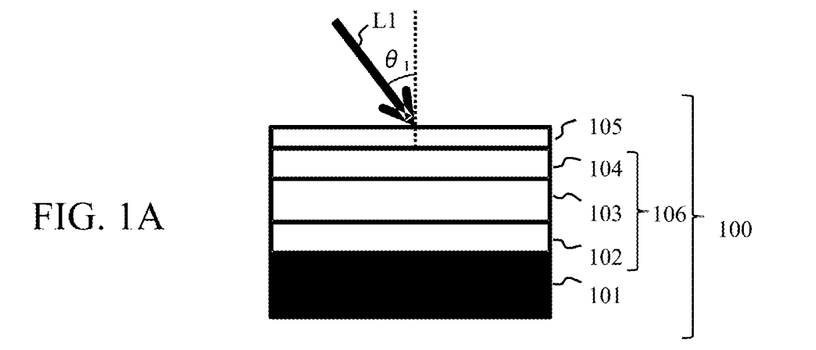
FIGS. 1A and 1B are schematic diagrams of an optical element according to embodiments of the present invention.
Figure 1B:
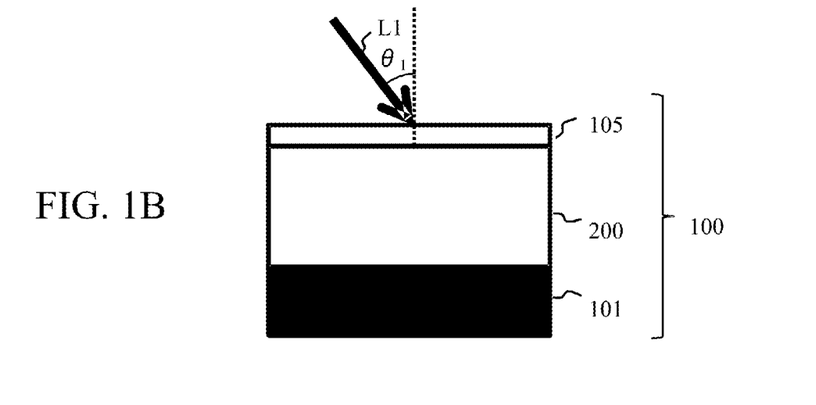

FIGS. 1A and 1B are schematic diagrams of an optical element 100 according to embodiments of the present invention. The optical element 100 includes an optical surface that has a multilayer film formed on a substrate 101. The multilayer film includes films 102 to 105. The films 102 to 104 can use light interference. In general, a thin film using light interference has an optical thickness sufficiently smaller than a used wavelength, and optical thicknesses of the films 102 to 105 are also within the above range. In this embodiment, a wavelength range of incident light L1 will be explained as a visible range, but the other wavelength range such as a near infrared wavelength may be used as the used wavelength range.

The films 102 to 104 are stacked in order from a substrate 101 side, and configure a film stack 106. The films 102 and 104 each have a first refractive index for the used wavelength, and the film 103 has a second refractive index for the used wavelength smaller than the first refractive index. In other words, the outermost layers of the film stack 106 are configured by the films 102 and 104 having a higher refractive index. A film configuration of the film stack 106 also has symmetry along with a stack direction. Accordingly, physical thicknesses of the films 102 and 104 are equivalent to each other.

If the film stack 106 includes at least two H-films (first films) having a first refractive index and at least one M-film (a second film) having a second refractive index smaller than the first refractive index, its outermost layers are configured by the H-film, and its film configuration has symmetry along with a stacking direction, the film stack 106 may have the other configuration. For example, the film stack 106 may be configured by repeatedly stacking the films 102 to 104, and may be configured to include films other than the films 102 to 104.

Nearly all materials of an interference thin film used for an optical element such as an optical lens have positive dispersion. The positive dispersion means that a refractive index increases with a smaller wavelength of light. Conversely, negative dispersion means that a refractive index decreases with a smaller wavelength of light. In general, when a wavelength of light shortens, in other words, a frequency increases, a transparent material has a higher refractive index by influence of polarization. Additionally, a dispersion quantity generally increases in proportion to an absolute value of a refractive index. A transparent material exceptionally has negative dispersion near a wavelength range where light is absorbed, but absorbs light at the same time, thereby being difficult to use as an interference thin film. Moreover, a material of a metal is known to have negative dispersion, but is difficult to use as an interference thin film for the same reason.

In this embodiment, a multilayer film having negative dispersion is virtually achieved on the basis of an interference thin film theory. Interference between lights reflected at upper and lower interfaces determines characteristics of the films 102 to 104. In interference of light, amplitude of a wave and a phase of light are important. In general, the amplitude of a wave is calculated by a value referred to as a Fresnel coefficient r. When a reflective index of a film on an incident surface side for the used wavelength is $n_0$, a reflective index of a film on an emitting surface side for the used wavelength is $n_1$, a propagation angle of light in the film on the incident surface side is $\theta_0$, and a propagation angle of light in the film on the emitting surface side is $\theta_1$, a Fresnel coefficient $r_s$ of S polarization is expressed by the following expression (1). A Fresnel coefficient $r_p$ of P polarization is also expressed by the following expression (2). In other words, the Fresnel coefficient $r_s$ of S polarization is calculated as an amplitude ratio of an electric field, and the Fresnel coefficient $r_p$ of P polarization is calculated as an amplitude ratio of a magnetic field.

$$r_s = \frac{E_{rs}}{E_{is}} = \frac{n_0\cos\theta_0 - n_1\cos\theta_1}{n_0\cos\theta_0 + n_1\cos\theta_1} \quad (1)$$

$$r_p = \frac{H_{rp}}{H_{ip}} = \frac{\cos\theta_0/n_0 - \cos\theta_1/n_1}{\cos\theta/n_0 + \cos\theta_0/n_1} \quad (2)$$

Meanwhile, when the used wavelength is $\lambda_i$, a refractive index of a film for the used wavelength is n, a physical thickness of the film is d, and a propagation angle of light in the film is $\theta$, a phase of a wave is expressed by the following expression (3) as a value referred to as a phase thickness $\Delta$.

$$\Delta = \frac{2\pi}{\lambda_i} nd\cos\theta \quad (3)$$

The propagation angles $\theta_0$, $\theta_1$ and $\theta$ of light in each film in the expressions (1) to (3) are calculated from an incident angle $\theta_i$ of the incident light L1 using Snell's law.

As expressed by the expressions (1) and (2), the Fresnel coefficient increases with an increase of refractive index differences between materials each configuring the interface. In a general material having positive dispersion, dispersion of a material having a high refractive index is larger than that of a material having a small refractive index. Thus, shortening a wavelength increases differences between refractive indexes, in other words, increases the amplitude of a wave.

As expressed by the expression (3), the phase thickness $\Delta$ varies according to the coefficient of the refractive index/the wavelength. In a general material having positive dispersion, the phase thickness $\Delta$ increases with shortening a wavelength.

Figure 2:
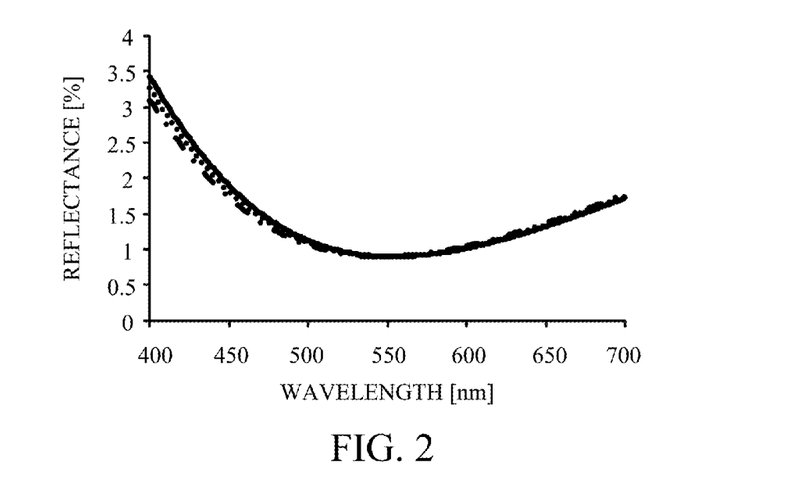
FIG. 2 is a chart illustrating reflectance characteristics of a $SiO_2$ film.
Figure 3:
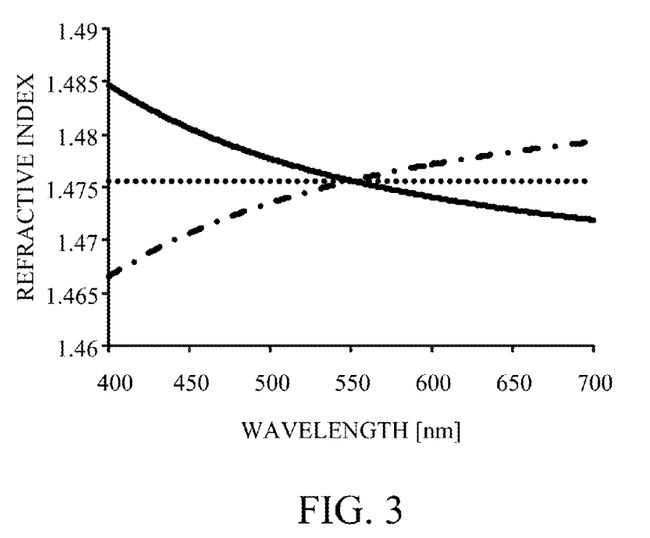
FIG. 3 is a chart illustrating refractive index dispersion of a $SiO_2$ film.
Figure 4:
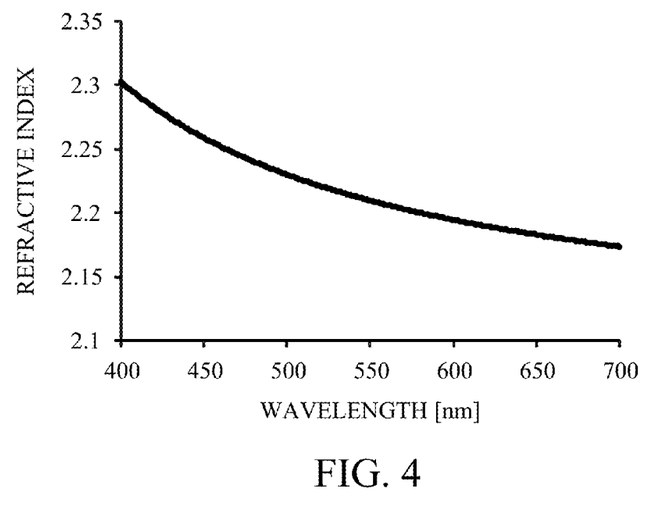
FIG. 4 is a chart illustrating refractive index dispersion of a $Ta_2O_5$ film.

As described above, in a material having positive dispersion, the Fresnel coefficient r and the phase thickness $\Delta$ increases with shortening a wavelength. In other words, varying a wavelength greatly changes a degree of interference. When a $SiO_2$ film used in this embodiment is formed on a grass substrate having a refractive index of 1.80, reflectance characteristics and refractive index dispersion are respectively shown in FIGS. 2 and 3. When the wavelength $\lambda$ is 550 nm and the incident angle $\theta_i$ is 0 degrees, a phase thickness of the $SiO_2$ film is set to be $\lambda/4$. In FIGS. 2 and 3, each solid line represents a graph in the case where the $SiO_2$ film has positive dispersion, each dotted line represents a graph in the case where the $SiO_2$ film does not have positive dispersion, and each dashed-dotted line represents a graph in the case where the $SiO_2$ film has negative dispersion. The graphs in the case where the $SiO_2$ film does not have positive dispersion or in the case where the $SiO_2$ film has negative dispersion are calculated using a computer. As illustrated in FIG. 2, reflectance significantly varies on a short wavelength side in any case, but a variation of reflectance in the case where the $SiO_2$ film does not have positive dispersion or in the case where the $SiO_2$ film has negative dispersion are suppressed compared to a variation of reflectance in the case where the $SiO_2$ has positive dispersion. As just described, characteristics of the interference film significantly varies according to a wavelength, but a variation of interference in the film including a general material having positive dispersion becomes larger. In addition, FIG. 4 is a chart illustrating refractive index dispersion of a $Ta_2O_5$ film used in this embodiment. The $Ta_2O_5$ film is transparent at a visible range, and has positive dispersion.

First Example

A material of an interference thin film generally has positive dispersion, and, in principle, it is difficult that a material of an interference film has negative dispersion. Thus, in this example, a multilayer film having negative dispersion is achieved by setting an appropriate refractive index of each thin film configuring the multilayer film and an appropriate thickness relation using an equivalent film theory that a multilayer film has a function equivalent to a thin film having one layer.

In a film stack 106 according to this example, films 102 to 104 are stacked in order from a substrate 101 side to satisfy the above condition. Below, each of the films 102 and 104, and the film 103 are explained as an H-film and an M-film, respectively. In this example, the following conditional expressions (4) to (6) should be satisfied.

$$\frac{2U_H U_M \tan\Delta_H + U_M^2 \tan\Delta_M - U_H^2 \tan^2\Delta_H \tan\Delta_M}{2U_H U_M \tan\Delta_H + U_H^2 \tan\Delta_M - U_M^2 \tan^2\Delta_H \tan\Delta_M} > 0 \quad (4)$$

$$U_{H,M} = n_{H,M}\cos\theta_{H,M} \quad (5)$$

$$\Delta_{H,M} = \frac{2\pi}{\lambda_i} n_{H,M} d_{H,M} \cos\theta_{H,M} \quad (6)$$

Here, $\theta_i$ is an incident angle of light incident on the multilayer film, and $\lambda_i$ is a used wavelength. Additionally, $n_H$ is a refractive index of the H-films 102 and 104 for the used wavelength $\lambda_i$, $d_H$ is a physical thickness of the H-films 102 and 104, $n_M$ is a refractive index of the M-film 103 for the used wavelength $\lambda_i$, $d_M$ is a physical thickness of the M-film 103. The incident angle $\theta_i$ is, as illustrated in FIG. 1, an angle of light incident on the multilayer film configured by the films 102 to 105 from an incident medium.

As illustrated in FIG. 1B, when the film stack 106 is converted into one equivalent film 200, an equivalent refractive index $n_T$ and a physical thickness $d_T$ of the equivalent film 200 are calculated using the following numerical expressions (7) to (11).

$$U_T^2 = U_1^2 \frac{2U_H U_M \tan\Delta_H + U_M^2 \tan\Delta_M - U_H^2 \tan^2\Delta_H \tan\Delta_M}{2U_H U_M \tan\Delta_H + U_H^2 \tan\Delta_M - U_M^2 \tan^2\Delta_H \tan\Delta_M} \quad (7)$$

$$\sin\Delta_T = \quad (8)$$
$$U_T\left(\frac{2}{U_H}\cos\Delta_H\sin\Delta_H\cos\Delta_M + \frac{U_H^2\cos^2\Delta_H - U_M^2\sin^2\Delta_H}{U_H^2 U_M}\sin\Delta_M\right)$$

$$\cos\Delta_T = \quad (9)$$
$$\cos^2\Delta_H\cos\Delta_M - \sin^2\Delta_H\cos\Delta_M - \frac{U_H^2 + U_M^2}{U_H H_M}\cos\Delta_H\sin\Delta_H\sin\Delta_M$$

$$U_{T,H,M} = \begin{cases} n_{T,H,M}\cos\theta_{T,H,M} & S \text{ poralization} \\ \frac{n_{T,H,M}}{\cos\theta_{T,H,M}} & P \text{ poralization} \end{cases} \quad (10)$$

$$\Delta_{T,H,M} = \frac{2\pi}{\lambda_i}n_{T,H,M}d_{T,H,M}\cos\theta_{T,H,M} \quad (11)$$

The equivalent refractive index $n_T$ and the physical thickness $d_T$ are calculated by obtaining a symbol $U_T$ and a phase thickness $\Delta_T$ from symbols $U_{H,M}$ and $\Delta_{H,M}$ using the above numerical expressions. As the symbol U differs depending on polarization, selecting the numerical expression according to incident polarization is required. The phase thickness $\Delta_T$ may be calculated using the numerical expressions (8) and (9). As each left side of the numerical expressions (8) and (9) is a trigonometric function, using either one of numerical expressions (8) and (9) cannot uniquely determine the phase thickness $\Delta_T$ within a range of 0 to 360 degrees, but using both of them can derive the phase thickness $\Delta_T$ within a range of 0 to 360 degrees.

As a left side of the numerical expression (7) is a square value, satisfying the conditional expression (4) over the entire range of a used wavelength range of an optical element 100 is required to enable the film stack 106 to function as the one equivalent film 200. When the conditional expression (4) is not satisfied, the film stack 106 is not functioned as a film having unique characteristics as the equivalent film 200, and the H-films 102 and 104, and the M-film 103 having different properties for each wavelength individually function. When each film individually functions, the film stack 106 cannot have negative dispersion as the one equivalent film 200. For example, when the film stack 106 satisfies the conditional expression (4) over a wide wavelength range like a visible range, each film need to select a sufficiently thin physical thickness. Moreover, though unintended film may be included when forming the H-film and the M-film, such a film generally has an optical thickness smaller than 10 nm and cannot function as a film, having no effect on the H-film and the M-film.

Additionally, when $d_{HO}$ is a physical thickness of the H-film 104 on an optical surface side of the outermost layers of the film stack 106 and $d_{MO}$ is a physical thickness of the M-film 103 adjacent to the H-film 104, the following conditional expression (12) is preferably satisfied.

$$n_{HO}d_{HO} + n_{MO}d_{MO} > 0.1\lambda \quad (12)$$

Figure 8:
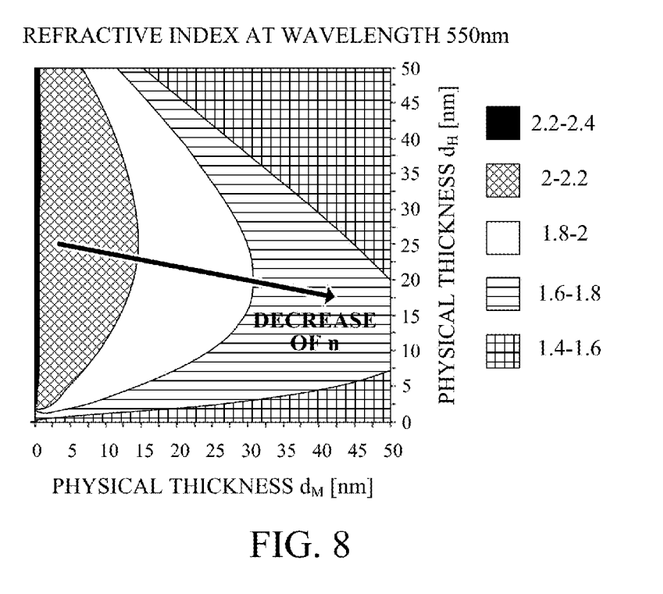
FIG. 8 is a diagram illustrating an equivalent refractive index for a wavelength of 550 nm (the first example).
Figure 9:
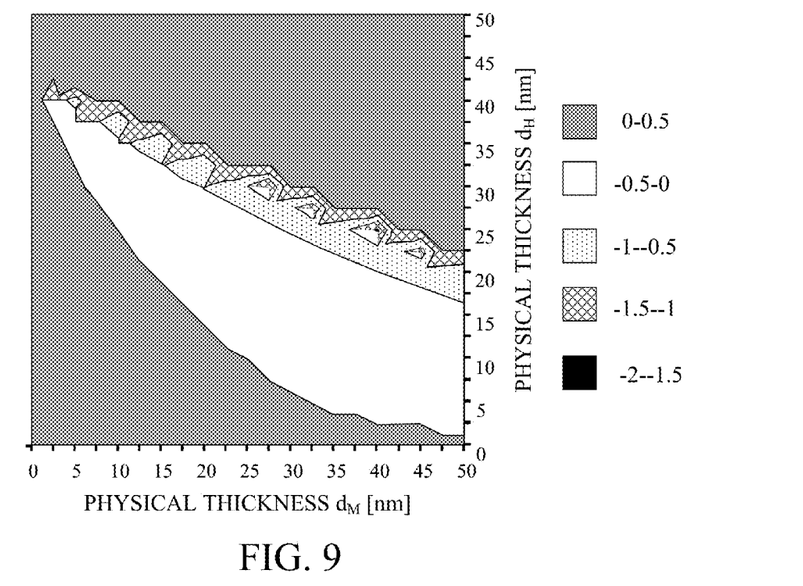
FIG. 9 is a diagram illustrating a refractive index of wavelengths of 400 to 700 nm (the first example).

In this example, the $Ta_2O_5$ film is used as the H-films 102 and 104, and the $SiO_2$ film is used as the M-film 103. FIG. 8 is a diagram illustrating an equivalent refractive index for a wavelength of 550 nm. FIG. 9 is a diagram illustrating a refractive index of wavelengths of 400 to 700 nm. An arrow of FIG. 8 represents a tendency that the equivalent refractive index $n_T$ decreases with an increase of the physical thickness $d_M$ of the M-film 103. Furthermore, in FIG. 9, a region of the film stack 106 that has positive dispersion or fails to satisfy the expression (1) is filled in black. The $Ta_2O_5$ film used as the H-films 102 and 104 has strong positive dispersion and thus the film stack 106 does not have negative dispersion under a predetermined condition, but satisfying the conditional expression (12) allows the film stack 106 to approximately have negative dispersion.

Satisfying the following conditional expression (13) at a central wavelength of the used wavelength range is also preferable.

$$-0.1 < \cos^2\Delta_H\cos\Delta_M - \quad (13)$$
$$\sin^2\Delta_H\cos\Delta_M - \frac{U_H^2 + U_M^2}{U_H U_M}\cos\Delta_H\sin\Delta_H\sin\Delta_M < 0.1$$

A center part of the conditional expression (13) is a right side of the numerical expression (9). In other words, the conditional expression (13) expresses that a cosine of the phase thickness $\Delta_T$ of the film stack 106 is near 0. This expresses that the phase thickness $\Delta_T$ is represented as 90[deg]+180[deg]×(arbitrary integer), and is an odd multiple of $\lambda/4$ when expressed using an optical thickness $n_T \times d_T$ of the film stack 106. When the optical thickness of the film stack 106 is $\lambda/4$, maximum amplitude and a maximum phase variation are observed as the interference thin film. Such a film stack 106 can be effectively used for an optical element such as a dielectric mirror, a dichroic mirror and an antireflection film.

Figure 5:
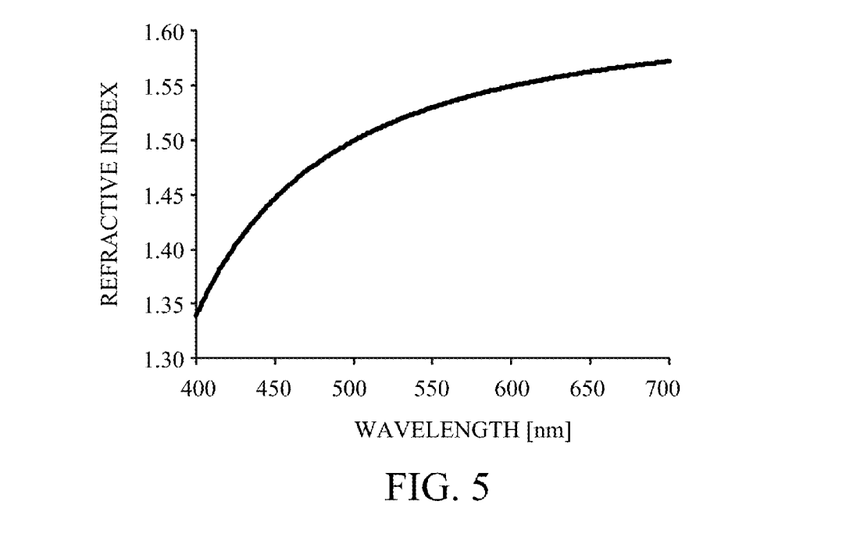
FIG. 5 is a chart illustrating an equivalent refractive index of an equivalent film (a first example).
Figure 6:
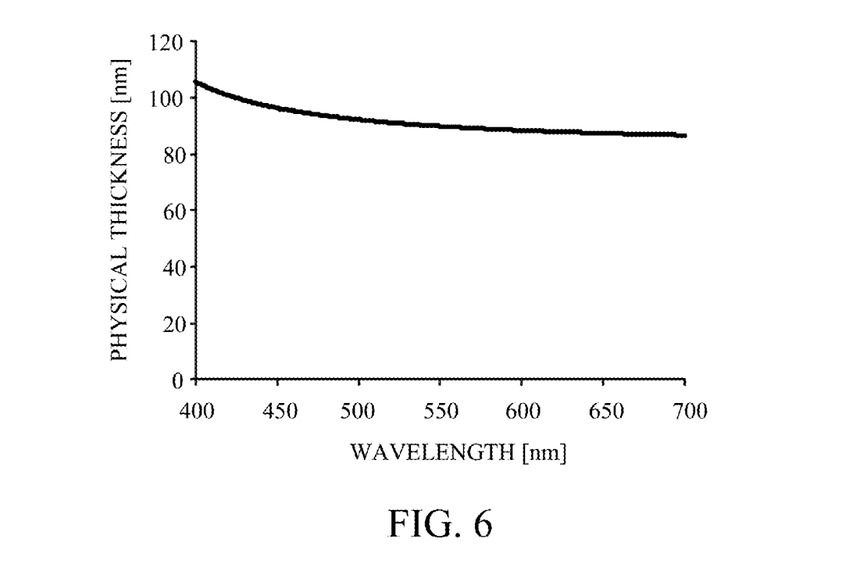
FIG. 6 is a chart illustrating an equivalent physical thickness of the equivalent film (the first example).
Figure 7:
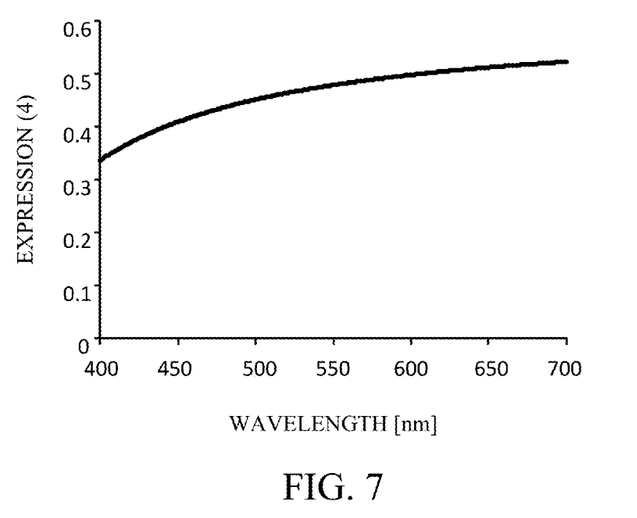
FIG. 7 is a chart illustrating a calculation result of a conditional expression (4) (the first example).

In this example, the $Ta_2O_5$ film having the phase thickness of 8.2 nm is used as the H-films 102 and 104, and the $SiO_2$ film having the phase thickness of 67.0 nm is used as the M-film 103. FIG. 5 is a chart illustrating the equivalent refractive index of the equivalent film 200. FIG. 6 is a chart illustrating the equivalent physical thickness of the equivalent film 200. FIG. 7 is a chart illustrating a calculation result of the conditional expression (4) when the incident angle $\theta_i$ is 0 degrees and the used wavelength range is a visible range. A design central wavelength is a wavelength of 550 nm.

As illustrated in FIG. 7, the calculation result is positive over the entire range of the visible range and thus satisfies the conditional expression (4). The center part of the conditional expression (13) is also 0 at a wavelength of 550 nm and thus satisfies the conditional expression (13). Accordingly, as illustrated in FIG. 5, the refractive index lowers on a short wavelength side. Moreover, the physical thickness of the equivalent film 200 varies for a wavelength by a phase of interference of a wave unlike a general thin film, being required to consider when designing the equivalent film 200.

Figure 10:
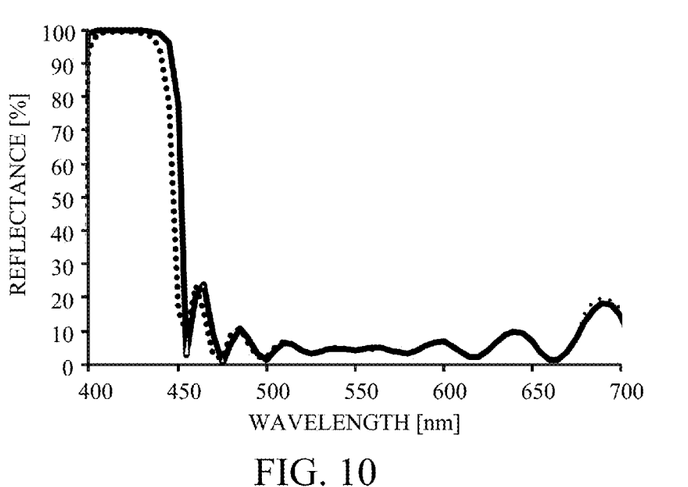
FIG. 10 is a chart illustrating reflectance characteristics of a dichroic film (the first example).

FIG. 10 is a chart illustrating reflectance characteristics of a dichroic film using the multilayer film according to this example. A solid line represents a graph of the dichroic film according to this example, and a dotted line represents a graph of a multilayer film according to a first comparison example using an YF$_3$ film having positive dispersion. Table 1 provides a film configuration according to this example, and Table 2 provides a film configuration according to the first comparison example.

TABLE 1

| # | Film | Wavelength n | Physical thickness [nm] | Equivalent refractive index $n_T$ | Equivalent Physical thickness $d_T$ [nm] | Film configuration |
|---|---|---|---|---|---|---|
| j1i | air | 1.000 | — | — | — | — |
| j14 | Ta$_2$O$_5$ | 2.209 | 8.2 | 1.530 | 89.9 | ×10 |
| j13 | SiO$_2$ | 1.472 | 67.0 | | | |
| j12 | Ta$_2$O$_5$ | 2.209 | 8.2 | | | |
| j11 | Ta$_2$O$_5$ | 2.209 | 124.5 | — | — | |
| j1s | White board | 1.530 | — | — | — | — |

TABLE 2

| # | Film | Wavelength n | Physical thickness [nm] | Equivalent refractive index $n_T$ | Equivalent Physical thickness $d_T$ [nm] | Film configuration |
|---|---|---|---|---|---|---|
| h1i | air | 1.000 | — | — | — | — |
| h12 | YF3 | 1.530 | 89.9 | — | — | ×10 |
| h11 | Ta$_2$O$_5$ | 2.209 | 124.5 | — | — | |
| h1s | White board | 1.530 | — | — | — | — |

As illustrated in FIG. 10, a range, which is less than or equal to a wavelength of 450 nm and is a reflection range of this example, is wider than that of the first comparison example. Reflectance corresponding to a wavelength, which is greater than or equal to a wavelength of 450 nm and is within a transmission range, also substantially remains unchanged. Accordingly, using negative dispersion can simply control a range. In general, using positive dispersion easily narrows a range, but requires a complicated film configuration to widen a range. A method of the present invention virtually achieving the multilayer film having negative dispersion can be one of countermeasures.

As shown in table 1, the Ta$_2$O$_5$ film is used as the H-film (films j12 and j14) of the film stack (films j12 to j14) according to this example. The Ta$_2$O$_5$ film is also used for the film j11. In manufacturing of the films, the films j11 and j12 may be formed as the film having the physical thickness of 132.7 nm at the same time without separately forming them. As just described, when the same material as the film stack having negative dispersion is used as a material of a thin film, the physical thickness may be synthesized.

In this example, the film stack (films j12 to j14) and the film j11 are repeated ten times. In other words, a stack group, where the film stack is repeated two times, is repeated five times. As described in a second example, repeating the film stack two times obtains an equivalent film having an optical thickness of λ/2. When the multilayer film according to this example using reflection is used, forming it to include at least five stack groups can improve efficiency of reflection. In manufacturing, a repeat count is preferably limited to 200 times.

When the multilayer film (films j11 to j14) are used, the optical thickness and the refractive index of each film need not completely coincide with each other, and may have a margin within a range not to deviate from the essence of thin film interference. The films having the refractive indexes different by about ±0.02 nm at a design central wavelength or the optical thicknesses different by a value being equal to or less than 1/20 of the design central wavelength may be regarded as having the same interference characteristics.

Second Example

In this example, an optical element 100 includes a multilayer film having an optical thickness $n_T \times d_T$ of λ/2 at a wavelength of 550 nm, and thus the multilayer film includes a plurality of film stacks 106. When the optical thickness $n_T \times d_T$ is λ/2, a phase thickness $\Delta_T$ is 180 degrees. At this time, in the expression (8), as the left side is 0, that is, the symbol $U_T$ is 0, the refractive index cannot be calculated. In other words, using only one film stack 106 cannot obtain the multilayer film having the optical thickness $n_T \times d_T$ of λ/2. Accordingly, the multilayer film is configured by a plurality of equivalent films 200 formed to have the optical thickness $n_T \times d_T$ of a value equal to or less than λ/4. This can increase a physical thickness without varying dispersion of a refractive index. As a result, the multilayer film having the optical thickness $n_T \times d_T$ of λ/2 can be obtained. The number of staking of the equivalent film 200 is preferably 2 or 3 times. More preferably, as this example, the equivalent film 200 is repeated two times.

Figure 11:
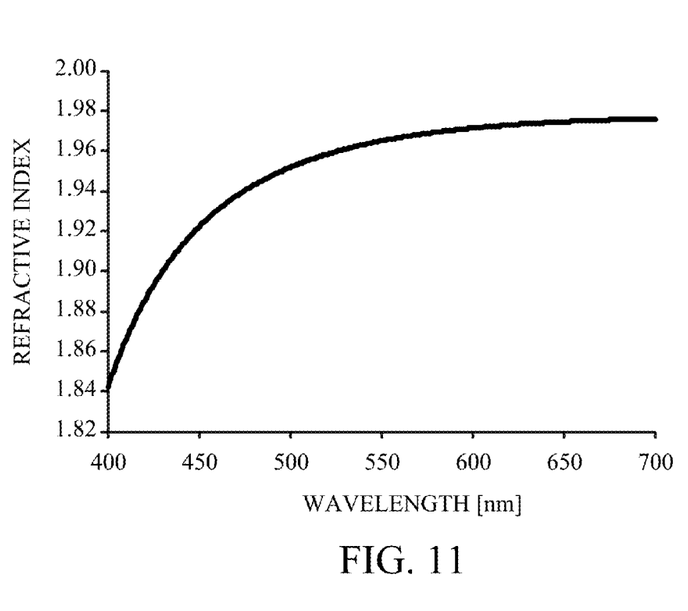
FIG. 11 is a chart illustrating an equivalent refractive index of an equivalent film (a second example).
Figure 12:
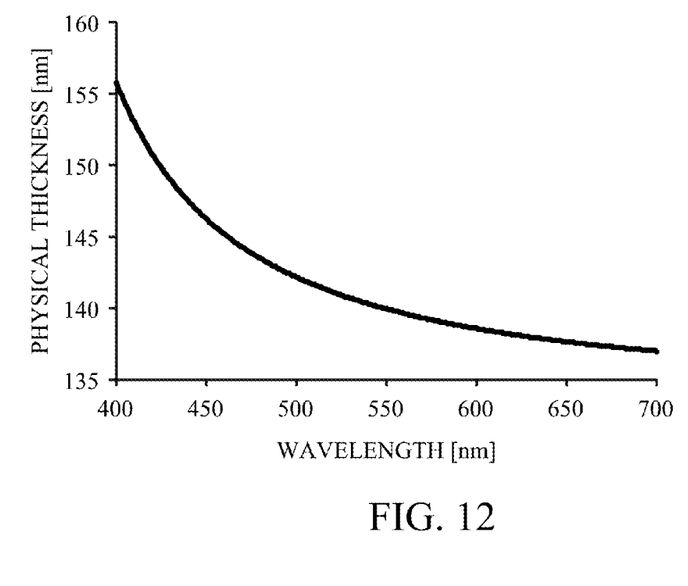
FIG. 12 is a chart illustrating an equivalent physical thickness of the equivalent film (the second example).
Figure 13:
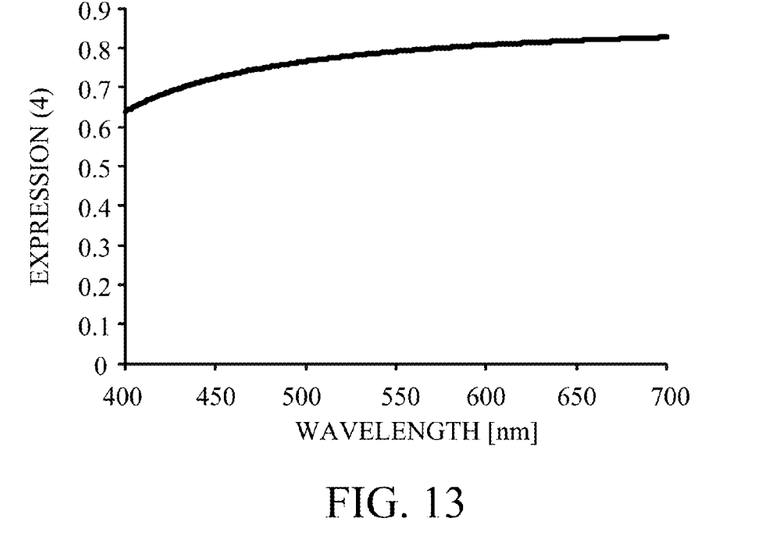
FIG. 13 is a chart illustrating a calculation result of a conditional expression (4) (the second example).

In this example, the Ta$_2$O$_5$ film having a physical thickness of 25.0 nm is used as H-films 102 and 104 of the film stack 106, and the SiO$_2$ film having a physical thickness of 17.0 nm is used as an M-film 103 of the film stack 106. The film stack 106 is also repeated two times. FIG. 11 is a chart illustrating an equivalent refractive index of the equivalent film 200. FIG. 12 is a chart illustrating an equivalent physical thickness of the equivalent film 200. FIG. 13 is a calculation result of the conditional expression (4) when an incident angle $\theta_i$ is 0 degrees and a used wavelength range is a visible range. A design central wavelength is a wavelength of 550 nm.

As illustrated in FIG. 13, the calculation result is positive over the entire range of the visible range, and thus satisfies the conditional expression (4). The center part of the conditional expression (13) is also 0 at a wavelength of 550 nm and thus satisfies the conditional expression (13). Accordingly, as illustrated in FIG. 11, the refractive index lowers on a short wavelength side.

Figure 14:
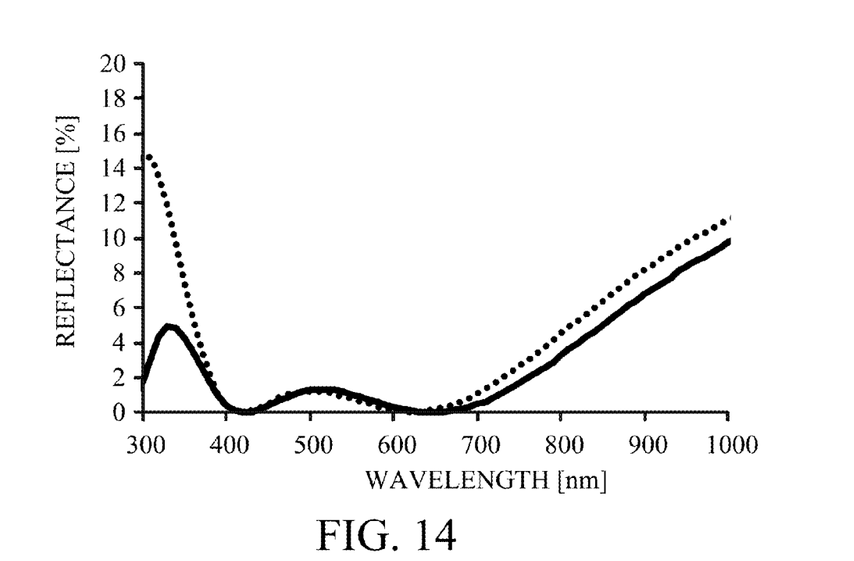
FIG. 14 is a chart illustrating reflectance characteristics of an antireflection film (the second example).

FIG. 14 is a chart illustrating reflectance characteristics of an antireflection film using the multilayer film according to this example. A solid line represents a graph of the antireflection film according to this example, and a dotted line represents a graph of a multilayer film according to a second comparison example. Additionally, the used wavelength range of the multilayer film according to this example is the visible range, but, in the figure, reflectance characteristics for wavelengths of 300 to 1000 nm are illustrated. Table 3 provides a film configuration according to this example, and Table 4 provides a film configuration according to the second comparison example.

TABLE 3

| # | Film | Wavelength n | Physical thickness [nm] | Equivalent refractive index $n_T$ | Equivalent Physical thickness $d_T$ [nm] | Film configuration |
|---|---|---|---|---|---|---|
| j2i | air | 1.000 | — | — | — | — |
| j27 | MgF$_2$ | 1.476 | 93.2 | — | — | — |
| j26 | Ta$_2$O$_5$ | 2.209 | 25.0 | 1.966 | 127.2 | ×1 |
| j25 | SiO$_2$ | 1.472 | 17.0 | | | |
| j24 | Ta$_2$O$_5$ | 2.209 | 25.0 | | | |

TABLE 3-continued

| # | Film | Wavelength n | Physical thickness [nm] | Equivalent refractive index $n_T$ | Equivalent Physical thickness $d_T$ [nm] | Film configuration |
|---|---|---|---|---|---|---|
| j23 | Ta$_2$O$_5$ | 2.209 | 25.0 | | | |
| j22 | SiO$_2$ | 1.472 | 17.0 | | | |
| j21 | Ta$_2$O$_5$ | 2.209 | 25.0 | | | |
| j2s | White board | 1.530 | — | — | — | — |

TABLE 4

| # | Film | Wavelength n | Physical thickness [nm] | Equivalent refractive index $n_T$ | Equivalent Physical thickness $d_T$ [nm] | Film configuration |
|---|---|---|---|---|---|---|
| h2i | air | 1.000 | — | — | — | — |
| h22 | MgF$_2$ | 1.476 | 93.2 | | | ×1 |
| h21 | ZrO$_{2+}$ Al$_2$O$_3$ | 1.970 | 139.6 | | | |
| h2s | White board | 1.530 | — | — | — | — |

As shown in table 3, in the multilayer film according to this example, two film stacks (films j21 to j23 and films j24 to j26) are repeatedly stacked. The two film stacks (the films j21 to j23 and the films j24 to j26) serve as one equivalent film. The equivalent refractive index $n_T$ and the physical thickness $d_T$ are respectively 1.966 and 127.2 nm.

As illustrated in FIG. 14, in a wide band, reflectance of this example is lower than that of the second comparison example. Accordingly, using the multilayer film according to this example to adjust a phase significantly improves efficiency compared to using a film having positive dispersion. Reflectance on the short wavelength of the equivalent film according to this example also especially drops. In general, when an antireflection film is formed using a thin film having a thickness of λ/2, λ/4 or a value thinner than them for a design central wavelength, reflectance on the short wavelength side rarely drops. This is because that reflection on the short wavelength is added to light having a peak wavelength. Lowering reflectance on the short wavelength is difficult, and, to obtain a wide band antireflection film having in a wide band, dropping characteristics on a long wavelength side is required. Using the multilayer film according to this example having negative dispersion, as illustrated in FIG. 14, improves reflectance characteristics on the short wavelength and thus can obtain a wide band antireflection film.

Third Example

Figure 15:
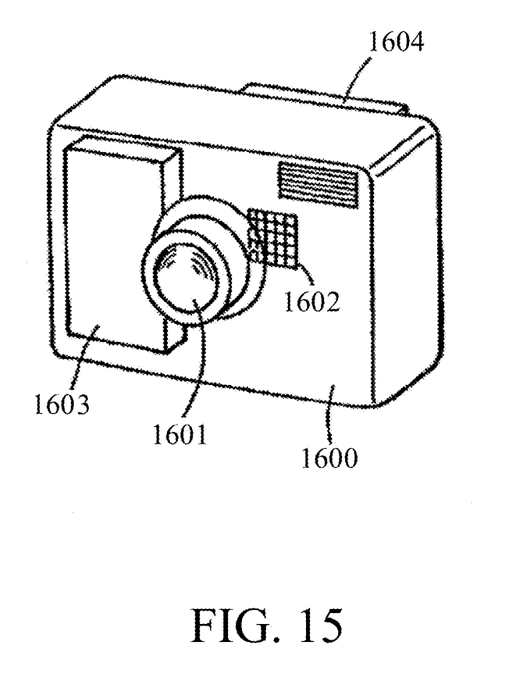
FIG. 15 is a perspective view of a digital camera as one example of an optical apparatus using an optical element of the present invention (a third example).

FIG. 15 is a perspective view of a digital camera as one example of an optical apparatus using an optical element 100 of the present invention. A digital camera includes a camera body 1600 and an image pickup optical system 1601. The image pickup optical system 1601 may be detachably attached to the camera body 1600. The camera body 1600 includes a solid image pickup element (a photoelectric conversion element) 1602 such as a CCD sensor and a CMOS sensor, a memory 1603 and a display 1604. The solid image pickup element 1602 is built in the camera body 1600 and receives an object image formed by the image pickup optical system 1601. The memory 1603 stores information corresponding to the object image photoelectrically converted by the solid image pickup element 1602.

The optical element 100 of the present invention is, for example, used for an antireflection film formed on a surface of an optical lens of the image pickup optical system 1601. Thereby, the image pickup optical system 1601 that improve transmittance in wider band can be provided. The optical element of the present invention can be also used for an optical apparatus including an optical system transmitting light of an apparatus such as a microscope and a projector.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-197553, filed on Oct. 5, 2015, which is hereby incorporated by reference herein in its entirety.

What is claimed is:

1. An optical element that includes an optical surface having a multilayer film,
wherein the multilayer film comprises at least two stacks, each of the at least two stacks including a first film having a first refractive index for a light of a wavelength of λi and a second film having a second refractive index for the light smaller than the first refractive index,
wherein outermost layers of each of the at least two stacks, which are a film disposed at a position closest to the optical surface in each of the at least two stacks and a film disposed at a position furthest away from the optical surface in each of the at least two stacks, are configured by the first film,
wherein a film configuration of each of the at least two stacks has symmetry along a stack direction such that each of the at least two stacks consists of the first film, the second film, and the first film from the position furthest away from the optical surface in each of the at least two stacks to the position closest to the optical surface in each of the at least two stacks, with the first films in each of the at least two stacks having equivalent physical thicknesses as each other, and
wherein the following conditional expressions are satisfied such that each of the at least two stacks functions as one equivalent film having negative dispersion:

$$\frac{2U_H U_M \tan\Delta_H + U_M^2 \tan\Delta_M - U_H^2 \tan^2\Delta_H \tan\Delta_M}{2U_H U_M \tan\Delta_H + U_H^2 \tan\Delta_M - U_M^2 \tan^2\Delta_H \tan\Delta_M} > 0,$$

$$U_H = n_H \cos\theta_H,$$

$$U_M = n_M \cos\theta_M,$$

$$\Delta_H = \frac{2\pi}{\lambda_i} n_H d_H \cos\theta_H, \text{ and}$$

$$\Delta_M = \frac{2\pi}{\lambda_i} n_M d_M \cos\theta_M,$$

where $\theta_H$ is a propagation angle of an incident light in the first film, $\theta_M$ is a propagation angle of the incident light in the second film, $n_H$ is the first refractive index, $n_M$ is the second refractive index, $d_H$ is a physical thickness of the first film, and $d_M$ is a physical thickness of the second film.

2. The optical element according to claim 1, wherein the following conditional expression is satisfied:

$$n_{HO}d_{HO}+n_{MO}d_{MO} > 0.1\lambda i$$

where $d_{HO}$ is a physical thickness of the one of the outermost films which is disposed on an optical surface side, and $d_{MO}$ is a physical thickness of a second film adjacent to the one of the outermost films which is disposed on the optical surface side.

3. The optical element according to claim 1, wherein the following conditional expression is satisfied at a central wavelength of a wavelength range which includes the wavelength of $\lambda i$ and at least either one of a visible range and a near infrared range:

$$-0.1 < \cos^2\Delta_H\cos\Delta_M - \sin^2\Delta_H\cos\Delta_M - \frac{U_H^2+U_M^2}{U_H U_M}\cos\Delta_H\sin\Delta_H\sin\Delta_M < 0.1.$$

4. The optical element according to claim 3, wherein the multilayer film includes three stacks.

5. The optical element according to claim 3, wherein the multilayer film includes at least five stack groups each having the at least two stacks.

6. An optical apparatus comprising:
a plurality of optical elements;
wherein at least one of the plurality of optical elements includes an optical surface having a multilayer film,
wherein the multilayer film comprises at least two stacks, each of the at least two stacks including a first film having a first refractive index for a light of a wavelength of $\lambda i$ and a second film having a second refractive index for the light smaller than the first refractive index,
wherein outermost layers of each of the at least two stacks, which are a film disposed at a position closest to the optical surface in each of the at least two stacks and a film disposed at a position furthest away from the optical surface in each of the at least two stacks are configured by the first film,
wherein a film configuration of each of the at least two stacks has symmetry along a stack direction such that each of the at least two stacks consists of the first film, the second film, and the first film from the position furthest away from the optical surface in each of the at least two stacks to the position closest to the optical surface in each of the at least two stacks, with the first films in each of the at least two stacks having equivalent physical thicknesses as each other, and
wherein the following conditional expressions are satisfied such that each of the at least two stacks functions as one equivalent film having negative dispersion:

$$\frac{2U_H U_M \tan\Delta_H + U_M^2\tan\Delta_M - U_H^2\tan^2\Delta_H\tan\Delta_M}{2U_H U_M \tan\Delta_H + U_H^2\tan\Delta_M - U_M^2\tan^2\Delta_H\tan\Delta_M} > 0,$$

$$U_H = n_H\cos\theta_H,$$

$$U_M = n_M\cos\theta_M,$$

$$\Delta_H = \frac{2\pi}{\lambda_i}n_H d_H\cos\theta_H, \text{ and}$$

$$\Delta_M = \frac{2\pi}{\lambda_i}n_M d_M\cos\theta_M,$$

where $\theta_H$ is a propagation angle of an incident light in the first film, $\theta_M$ is a propagation angle of the incident light in the second film, $n_H$ is the first refractive index, $n_M$ is the second refractive index, $d_H$ is a physical thickness of the first film, and $d_M$ is a physical thickness of the second film.

* * * * *